United States Patent Office 2,920,098
Patented Jan. 5, 1960

2,920,098

ACRYLONITRILE SYNTHESIS

Harry O. Burrus, John L. Sheard, and Sterling N. Vines, Lewiston, N.Y., assignors to E. I. du Pont de Nemours and Company, Wilmington, Del., a corporation of Delaware No Drawing. Application January 30, 1957
Serial No. 637,060

16 Claims. (Cl. 260—465.3)

This invention relates to the production of acrylonitrile from hydrogen cyanide and acetylene and is concerned more specifically with a new catalyst system for the synthesis reaction.

The formation of acrylonitrile by the reaction of acetylene with hydrogen cyanide according to the best present art is catalyzed by aqueous cuprous chloride catalytic systems. Such aqueous systems, however, are unsatisfactory in that side reactions take place to an undesirable extent. Among the undesired reaction products are organic impurities, often of a tarry nature which foul the reaction system and reduce the reaction to an uneconomic rate so that intermittent or continuous replenishment with fresh catalyst is required. The inactivated or fouled catalyst must be reworked for its copper values because it is too costly to discard it to waste. Often inorganic impurities accumulate, such as ammonium chloride, and these dilute the catalyst and a costly revivifying operation must be continuously employed where large scale commercial production of acrylonitrile is involved. Another major difficulty with the aqueous systems is that often highly undesirable volatile impurities are produced which require costly procedures for separation from the crude acrylonitrile. Such impurities are acetaldehyde, lactonitrile, mono and divinyl acetylene, and other condensation products which are often very difficult to separate from the acrylonitrile and are deleterious when the acrylonitrile is to be used in making polymers or is a starting material in the synthesis of other products.

It is accordingly an object of the present invention to provide a catalyst medium for the production of acrylonitrile in which the formation of side-reactions is at least greatly diminished if not practically eliminated. It is another object to provide a catalyst system which will have a longer life at a high rate of activity before requiring replacement. A further object is a catalyst system which does not accumulate undesirable fouling impurities to reduce its activity after relatively short periods of operation. A still further object is a catalyst system which will produce acrylonitrile containing little or no by-products impurities such as acetaldehyde, vinyl acetylene, etc.

These and other objects are accomplished by preparing a catalyst comprising a solution of cuprous chloride in an organic nitrile and passing hydrogen cyanide together with an excess of acetylene into this catalyst preferably at an elevated temperature along with small amounts of a strong anhydrous acid, preferably hydrogen chloride. The catalytic solution should be anhydrous, this term being used in the usual technical sense to signify a degree of dryness which is practical in commercial operation.

We have now discovered that organic nitriles are good solvents for cuprous chloride and that these solutions are effective catalysts for the liquid phase reaction between hydrogen cyanide and acetylene provided certain reaction conditions are maintained. Among these conditions are a large excess of acetylene to hydrogen cyanide, a fairly high space velocity of reactant gases in the catalyst, and a fairly high temperature, preferably above 100° C. and not below the boiling point of the acrylonitrile.

In using a non-aqueous cuprous chloride catalyst system it has heretofore been assumed that an acid salt, specifically the hydrochloride of an organic nitrogen base, such as pyridine, had to be present as a solubilizer. However, we have found that a catalyst system composed of cuprous chloride and a single organic nitrile solvent can be used effectively without the presence of this third component. Indeed, a third component such as the hydrochloride of an organic nitrogen base may be present but in general its presence will not add to the efficiency of the system. We have found that the essentially salt-solubilizer-free system of nitrile and cuprous chloride is much to be preferred both because of its greater activity as a catalyst and also because such a system is more easily controlled since it is less complex.

It has also been observed that as a specific binary catalyst system comprised of an organic nitrile and cuprous chloride ages in use in the synthesis of acrylonitrile the system becomes increasingly more efficient both as to space time yield and as to hydrogen cyanide conversion and yield related to the acrylonitrile produced, provided the optimum reaction conditions are maintained.

The following examples will explain the invention in greater detail.

EXAMPLE 1

An anhydrous solution comprising 400 g. cuprous chloride in 400 ml. phenylacetonitrile was heated in a glass reactor at a temperature of about 150° C. and for a period of 4 hours. A gas mixture of hydrogen cyanide and acetylene in a volume ratio of 1 to 6 and a space velocity per hour of about 90 was passed into the catalyst solution which was stirred rapidly with a common laboratory type of motor driven stirrer. The gas mixture carried a small amount of hydrogen chloride continuously into the catalyst solution. The HCN fed to the catalyst over this period was 30 g. The yield of acrylonitrile based on the hydrogen cyanide fed to the system was 54% of theory. The conversion of HCN was 40%.

EXAMPLE 2

An anhydrous solution comprising 450 grams of cuprous chloride in 675 grams of adiponitrile was placed in a glass flask provided with a mechanical stirrer. Various mixtures of hydrogen cyanide and acetylene were passed into this catalyst at different temperatures over a period of over 5 days with a few hours of operation each day. On the first day during the 4th hour of operation HCN and $C_2H_2$ were fed into the catalyst at 120° C. at a space velocity per hour of 49 and a ratio of 1 to 17. A conversion of hydrogen cyanide to acrylonitrile of 36.5% of theory was obtained at a good recovery. No hydrogen chloride was added to the catalyst.

EXAMPLE 3

The same catalyst of Example 2 in its 9th hour of operation at 120° C. on the second day showed a conversion of HCN to acrylonitrile of 38.6% and a yield of 88.5% of theory. The space velocity per hour of the gases fed was 50 at a ratio of 1 to 12.5 of hydrogen cyanide to acetylene. No hydrogen chloride was added to the catalyst.

EXAMPLE 4

The same solution of Example 2 in its 16th hour of intermittent operation over a period of three days showed a conversion based on the hydrogen cyanide fed of 78.8% and a yield of 92.6% of theory. The space velocity per hour of the gases entering the catalyst solution 51 and the ratio of HCN to C₂H₂ was 1 to 9.3. Temperature of the catalyst solution was about 135° C. and the productivity in grams per hour per kilogram of cuprous chloride was 22.5. No hydrogen chloride was added to the catalyst. After this period of operation the catalyst slowly lost efficiency primarily because hydrogen chloride was not added.

EXAMPLE 5

An anhydrous solution of 800 grams of cuprous chloride in 1200 grams of benzonitrile was placed in a glass tube reactor 36 inches long and of 61 mm. outside diameter. The reactant feed gases provided the necessary stirring. Hydrogen cyanide and acetylene together with small amounts of dry hydrogen chloride were fed into this catalyst solution continuously for a period of over 150 hours. The temperature was maintained at about 135° C. The rate of feed and the ratio of hydrogen cyanide to acetylene was varied. About 0.5 gram dry hydrogen chloride was added with the gas feed during each hour of operation. The results are given in Table I for 4 hour periods spread over 8 days of operation. The conversion as a percent of HCN to acrylonitrile per pass is given as well as the theoretical yield of acrylonitrile taking into account the HCN recovered. The S.T.Y. figure represents the production in grams of acrylonitrile per hour per kilogram of cuprous chloride.

Table I

| Period of Operation, Hours | HCN, Grams/hr. | Ratio, C₂H₂/HCN | Conversion | Yield | S.T.Y. |
|---|---|---|---|---|---|
| 1-4 | 13.14 | 13.8 | 64 | 66.8 | 32 |
| 20-24 | 13.85 | 13.1 | 79.2 | 87.5 | 43.3 |
| 44-48 | 13.68 | 13.2 | 77.4 | 85.0 | 40.2 |
| 68-72 | 12.57 | 14.4 | 84.8 | 90.0 | 40.4 |
| 96-100 | 13.87 | 13.1 | 84.7 | 87.3 | 45.2 |
| 120-124 | 17.05 | 10.6 | 83.8 | 85.0 | 55.3 |
| 152-156 | 23.04 | 7.9 | 84.3 | 88.1 | 74.8 |

The catalyst system must be maintained on the acid side and this is preferably accomplished by continuous addition of a small amount of dry hydrogen chloride along with the reactant gases. The amount of hydrogen chloride should be no less than about 0.01% of the weight of the hydrogen cyanide used and may be as high as 10%. Preferably we add 1 to 5% by weight of HCl to HCN and it is best to make the addition continuously with the gas feed to the reactor.

A temperature of at least 100° C., seems necessary for securing an effective catalyst activity. The temperature may be higher than 150° C., however it is preferable to operate at a temperature at which the vapor pressure of the nitrile used will not be excessive. The nitrile passing out of the catalyst with the acrylonitrile and unreacted hydrogen cyanide and acetylene may be recovered and returned to the catalyst system.

Our two component non-aqueous system requires that the acetylene passed into the catalyst be in several fold molar excess of the hydrogen cyanide. In general we prefer a six fold excess but operation at the lower ratio of 2 moles of acetylene to one mole of hydrogen cyanide may be used under some conditions but catalyst activity may decrease more rapidly. A higher excess, up to 15 moles to one may be used but there is no advantage in exceeding the 15 to 1 ratio of C₂H₂ to HCN.

Although benzonitrile, adiponitrile and phenylacetonitrile are very suitable media as anhydrous solvents for cuprous chloride for the synthesis of acrylonitrile free from excessive contamination with side reaction products other nitriles, both aliphatic and aromatic can be used provided they boil at or above the boiling point of acrylonitrile but preferably above about 100° C., at atmospheric pressure. Such nitriles may contain one or more nitrile groups but they must of course be thermally stable under the conditions of reaction. The butyro nitriles and their higher homologs are usable as well as the aromatic nitriles. Aliphatic nitriles containing aromatic radicals can also be used.

It is possible to use a mixture of nitriles but preferably the mixture should boil above about 100° C.

We claim:

1. The process for making acrylonitrile comprising passing hydrogen cyanide and an excess of acetylene into an anhydrous catalytic solution of cuprous chloride and an organic nitrile having a boiling point at atmospheric pressure above about 100° C., as the essential component for dissolving the cuprous chloride, said solution being maintained on the acid side and at a temperature above the boiling point of the acrylonitrile.

2. The process for making acrylonitrile comprising passing hydrogen cyanide and an excess of acetylene together with a small amount of anhydrous hydrogen chloride into an anhydrous catalytic solution of cuprous chloride dissolved in an organic nitrile substantially free from hydrochloride salts of organic amines, said nitrile having a boiling point above that of the acrylonitrile and said solution being at a temperature above the boiling point of the acrylonitrile.

3. The process for making acrylonitrile comprising passing hydrogen cyanide and an excess of acetylene together with a small amount of anhydrous hydrogen chloride into an anhydrous catalytic solution of cuprous chloride the cuprous chloride solvent consisting essentially of an organic nitrile having a boiling point at atmospheric pressure above about 100° C., said solution being maintained on the acid side and at a temperature above the boiling point of the acrylonitrile.

4. The process for making acrylonitrile comprising passing hydrogen cyanide and acetylene in a molar ratio of 1:2 to 1:15 together with upwards of 0.01% by weight of hydrogen chloride based on said hydrogen cyanide into an anhydrous catalytic solution of cuprous chloride dissolved in an organic nitrile having a boiling point at atmospheric pressure above about 100° C. without adding salt solubilizer for the cuprous chloride, maintaining said solution above about 100° C. and distilling therefrom the acrylonitrile as formed.

5. The process for making acrylonitrile comprising passing hydrogen cyanide and acetylene in a molar ratio of about 1:2 to 1:15 together with upwards of 0.01% by weight of hydrogen chloride based on the weight of said hydrogen cyanide into an anhydrous catalytic solution of cuprous chloride dissolved in a second component which is an essential component for dissolving the cuprous chloride and is the only such component used, said component consisting essentially of an organic nitrile having a boiling point above about 100° C. at atmospheric pressure, maintaining said catalytic solution at a temperature between about 100° C. and the boiling point of said nitrile, recovering acrylonitrile together with unreacted hydrogen cyanide and acetylene from the vapors leaving said catalytic solution and recycling to said catalytic solution said unreacted hydrogen cyanide and acetylene.

6. The process of claim 1 in which the organic nitrile is benzonitrile.

7. The process of claim 2 in which the organic nitrile is benzonitrile.

8. The process of claim 3 in which the organic nitrile is benzonitrile.

9. The process of claim 4 in which the organic nitrile is benzonitrile.

10. The process of claim 5 in which the organic nitrile is benzonitrile.

11. The process of claim 1 in which the organic nitrile is phenylacetonitrile.

12. The process of claim 1 in which the organic nitrile is adiponitrile.

13. The process of claim 2 in which the organic nitrile is phenylacetonitrile.

14. The process of claim 2 in which the organic nitrile is adiponitrile.

15. In the acrylonitrile process employing a cuprous chloride catalyst for the synthesis of acrylonitrile from hydrogen cyanide and acetylene, the improvement of catalyzing said synthesis with a catalyst comprising an anhydrous solution of cuprous chloride in a nitrile boiling above about 100° C. at atmospheric pressure as the essential component for dissolving the cuprous chloride.

16. In the acrylonitrile process employing a cuprous chloride catalyst for the synthesis of acrylonitrile from hydrogen cyanide and acetylene, the improvement of catalyzing said synthesis with a catalyst comprising an anhydrous solution of cuprous chloride in benzonitrile.

References Cited in the file of this patent

UNITED STATES PATENTS

| | | |
|---|---|---|
| 2,409,124 | Heuser | Oct. 8, 1946 |
| 2,417,068 | Farlow et al. | Mar. 11, 1947 |
| 2,553,008 | Sager | May 15, 1951 |
| 2,649,472 | Lovett | Aug. 18, 1953 |
| 2,778,847 | Fujisaki et al. | Jan. 22, 1957 |
| 2,798,882 | Christopher et al. | July 9, 1957 |
| 2,798,884 | Christopher et al. | July 9, 1957 |